United States Patent
Kamatani

Patent Number: 5,959,280
Date of Patent: *Sep. 28, 1999

[54] MULTI-STANDARD OPTICAL DISK READING APPARATUS AND METHOD OF READING USING SAME

[75] Inventor: Yasuo Kamatani, Sagamihara, Japan

[73] Assignee: Laser Dynamics, Inc., Sagamihara, Japan

[*] Notice: This patent is subject to a terminal disclaimer.

[21] Appl. No.: 08/786,372

[22] Filed: Jan. 16, 1997

[51] Int. Cl.$^6$ .............................. G06K 7/00; G06K 7/10
[52] U.S. Cl. .................. 235/454; 235/435; 235/494; 369/58; 369/44.29
[58] Field of Search .................. 235/454, 435, 235/494, 439; 369/58, 44.27, 44.29, 44.31

[56] References Cited

U.S. PATENT DOCUMENTS

| | | | |
|---|---|---|---|
| 4,739,345 | 4/1988 | Namba et al. | 369/283 |
| 4,837,758 | 6/1989 | Motoyama et al. | 369/13 |
| 4,989,195 | 1/1991 | Suzuki | 369/50 |
| 5,289,451 | 2/1994 | Ashinuma et al. | 369/58 |
| 5,418,766 | 5/1995 | Fujisawa et al. | 369/54 |
| 5,463,602 | 10/1995 | Oka et al. | 369/44.69 |
| 5,541,900 | 6/1996 | Ito et al. | 369/54 |
| 5,561,643 | 10/1996 | Yamazaki et al. | 369/15 |
| 5,587,975 | 12/1996 | Kobyashi | 369/13 |
| 5,587,981 | 12/1996 | Kamatani | 369/58 |
| 5,608,718 | 3/1997 | Schieew | 369/275.3 |
| 5,638,345 | 6/1997 | Hosoya | 369/32 |
| 5,646,920 | 7/1997 | Raczynski | 369/47 |
| 5,757,742 | 5/1998 | Akiba et al. | 369/44.23 |

FOREIGN PATENT DOCUMENTS

| | | | |
|---|---|---|---|
| 0700039 | 3/1996 | European Pat. Off. | 235/454 |
| 0745982 | 12/1996 | European Pat. Off. | 235/454 |
| 0760509 | 3/1997 | European Pat. Off. | 235/454 |
| 0800128 | 10/1997 | European Pat. Off. | 235/454 |
| 0807926 | 11/1997 | European Pat. Off. | 235/454 |

*Primary Examiner*—Donald Hajec
*Assistant Examiner*—Daniel St. Cyr
*Attorney, Agent, or Firm*—Rabin & Champagne, P.C.

[57] ABSTRACT

An optical disk reading apparatus and method to provide an optical disk reading system which is able to reproduce encoded optical data from varied optical disk formats fabricated in accordance with different standards. After loading an optical disk, a sensing device detects the total number of data layers, diameter or thickness, to identify the standard of the optical disk. The standard or type of an optical disk can be identified by detecting an identification mark, if the optical disk has one. A central processing unit (CPU) distinguishes the standard by referring the detected signal to stored data about the standard of various optical disk formats. In order to reproduce encoded data on the loaded optical disk, the CPU modulates the servo control circuit to set up the movement of the servo mechanisms according to the identified standard of the optical disk. Also the CPU operates the data processor to select an appropriate data encoding circuit in the data processor, according to the standard of the optical disk. After the initial set-up of the servo mechanisms and the data processor is determined, the data reproduction is started.

14 Claims, 4 Drawing Sheets

MULTI-STANDARD OPTICAL DISK READING APPARATUS AND METHOD OF READING USING SAME

BACKGROUND OF THE INVENTION

1. Field of the Invention

This invention relates to an optical data storage system. More specifically, this invention relates to an optical reading apparatus and related method for an optical data reproduction system which is able to reproduce encoded data at different pit density on varied types of optical disk formats.

2. Description of the Prior Art

Initialized by the vast increase in informatsion that needs to be processed, optical data storage system; have become very important, particularly because of their high storage density per unit area. Most of the recent optical informatsion storage systems use a rotating single optical disk on which the informatsion is digitally stored in concentric circular tracks in an ordered, predefined manner to allow chronological fast reading and fast random access to desired pits of data.

At present, varied types of optical disk systems are provided, for example, the compact disk (CD) system, the Mini-Disk (MD) system and the multi-layered optical disk for digital video disk (DVD) system. Each of these system types use a optical disk format that is fabricated dependent upon a different standard. And thickness or pit density of the optical disks are different from one another. An optical reading system is needed which is able to reproduce the encoded data from any types of optical disk format.

SUMMARY OF THE INVENTION

The present invention has for its object to provide a multi-standard optical disk reading system having a capability to sense and determine the type of the optical disk format. This invention can provide an optical disk reading system which is able to read encoded pits on varied types of optical disk format.

The object of the present invention can be achieved by an optical disk reading apparatus and method, the apparatus comprising: a sensing device to detect total number of layers, thickness or diameter of an optical disk, a servo control circuit which controls each servo mechanism such as a focusing servo and a tracking servo, a data processor to process signals detected by a detector in an optical head, and a central processing unit (CPU) which operates the servo control circuit and the data processor for the data reproduction. The total number of data layers, the thickness, or the diameter of the optical disk is detected by the sensing device. Then the standard of the loaded optical disk is determined by processing a detected signal from the sensing device. The CPU references the detected signal to stored data about the standard of varied optical disk format, and then the standard of the loaded optical disk is distinguished by the CPU. In order to reproduce encoded data on the loaded optical disk, the CPU modulates the servo control circuit to set up the movement of the servo mechanisms according to the standard of the optical disk. Also the CPU operates the data processor to select an appropriate data encoding circuit in the data processor according to the standard of the optical disk. After the initial set-up of the servo mechanisms and the data processor is determined, the data reproduction is started.

For a fuller understanding of the nature and advantages of the present invention reference should be made to the following detailed description taken in conjunction with the accompanying drawings.

DETAILED DESCRIPTION OF THE PREFERRED EMBODIMENTS

Embodiments of the present invention will be explained with reference to the drawings.

Figure 1:
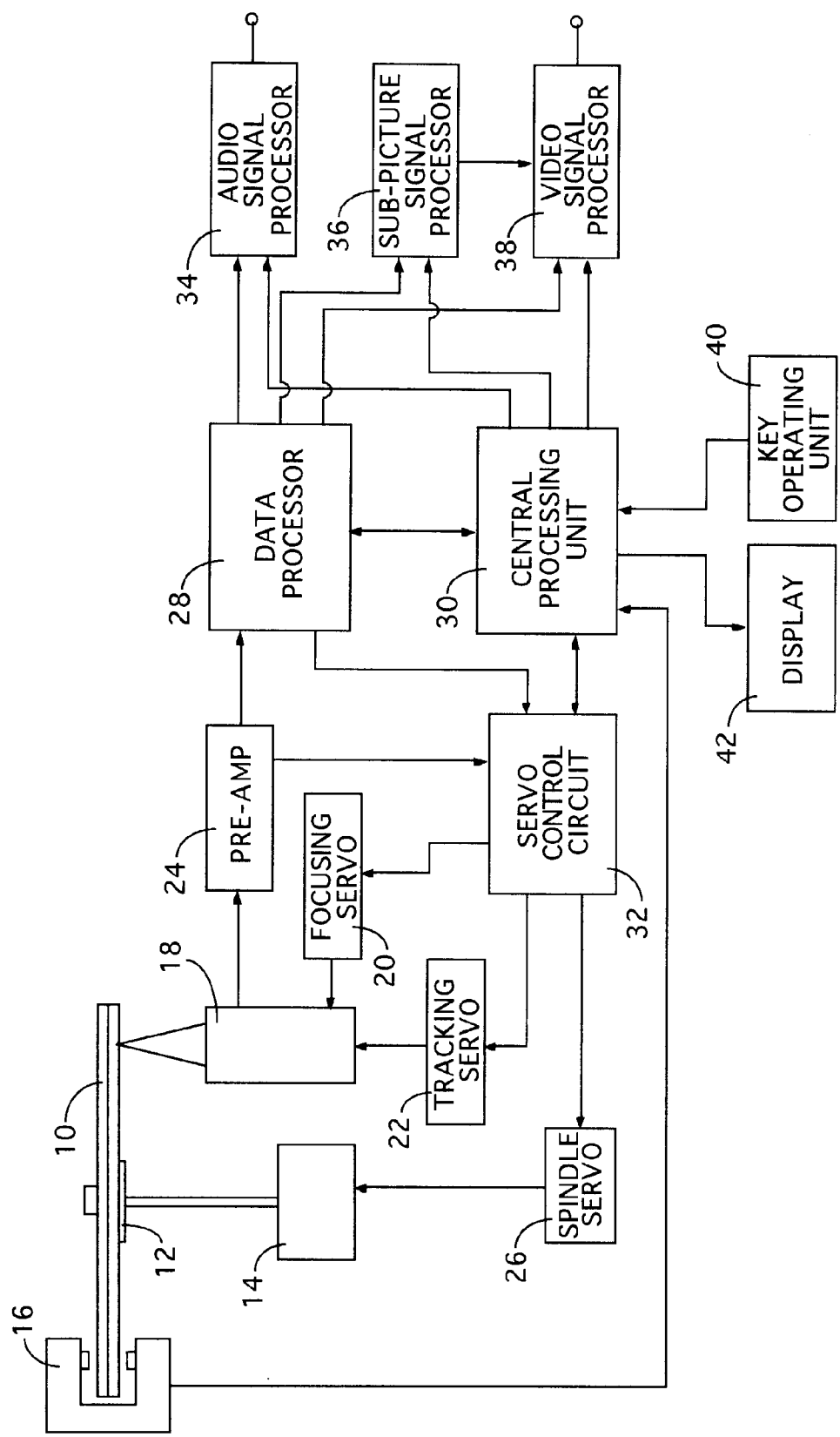
FIG. 1 is a block diagram of a first example of an optical reading apparatus to which the present invention can be applied.

FIG. 1 is a block diagram of a first example of an optical reading apparatus to which the optical disk reading methods of the present invention can be applied. An optical disk 10 represents one of the optical disk formats among a compact disk (CD), a Mini-Disk (MD), a digital video disk (DVD) or any other. The optical disk 10 is mounted on and secured by a turntable 12 to be rotated by a spindle motor 14. And the total number of data layers or thickness of the optical disk 10 is detected by a photo-interrupter 16 to distinguish the standard and type of the optical disk 10. Encoded pits on the optical disk 10 are read by a pickup 18 which includes a laser diode, a focusing lens, a focusing lens actuator, a tracking actuator and a photo-detector. The output signal from the pickup 18 is transmitted to a focusing servo circuit 20, a tracking servo circuit 22 and a pre-amplifier 24. According to a focusing error signal, the focusing servo circuit 20 modulates the focusing lens actuator to move the focusing lens. And according to a tracking error signal, the tracking servo circuit 22 modulates the tracking actuator to move the pickup 18. The spindle servo circuit 26 modulates the spindle motor 14 in order to track the linear velocity of the optical disk 10.

The output signal applied to the pre-amplifier 24 from the pickup 18, is transmitted to a data processor 28. Then the decoded signal is processed by a central processing unit 30 (CPU). The CPU 30 also processes a detected signal from the photo-interrupter 16 to identify the standard or type of the optical disk 10. The CPU 30 references the detected signal to stored data about the standard of varied optical disk format, in order to distinguish the standard of the optical disk 10. After the standard of the optical disk 10 is identified, a servo control circuit 32 determines the position of, or selects of the focusing lens, by modulating the focusing servo circuit 20, and the tracking servo circuit 22 is modulated to move the pickup 18 in order to trace the pit lane which is fabricated in accordance with the pit density standard.

According to the identified standard of the optical disk 10, the CPU 30 operates the data processor 28 to select an appropriate data encoding circuit in the data processor 28. Then the output signal amplified by the pre-amplifier 24 is decoded by the data processor 28. And the decoded signal is transmitted to an audio processor 34, a sub-picture processor 36 and a video processor 38. The audio processor 34, the sub-picture processor 36 and the video processor 38 are controlled by the CPU 30. The CPU 30 is operated by an operation signal from a key operating unit 40 which transmits all operating signals of an operator. The CPU 30 also controls a display unit 42 to show the status of data reproduction to the operator.

Figure 2A:
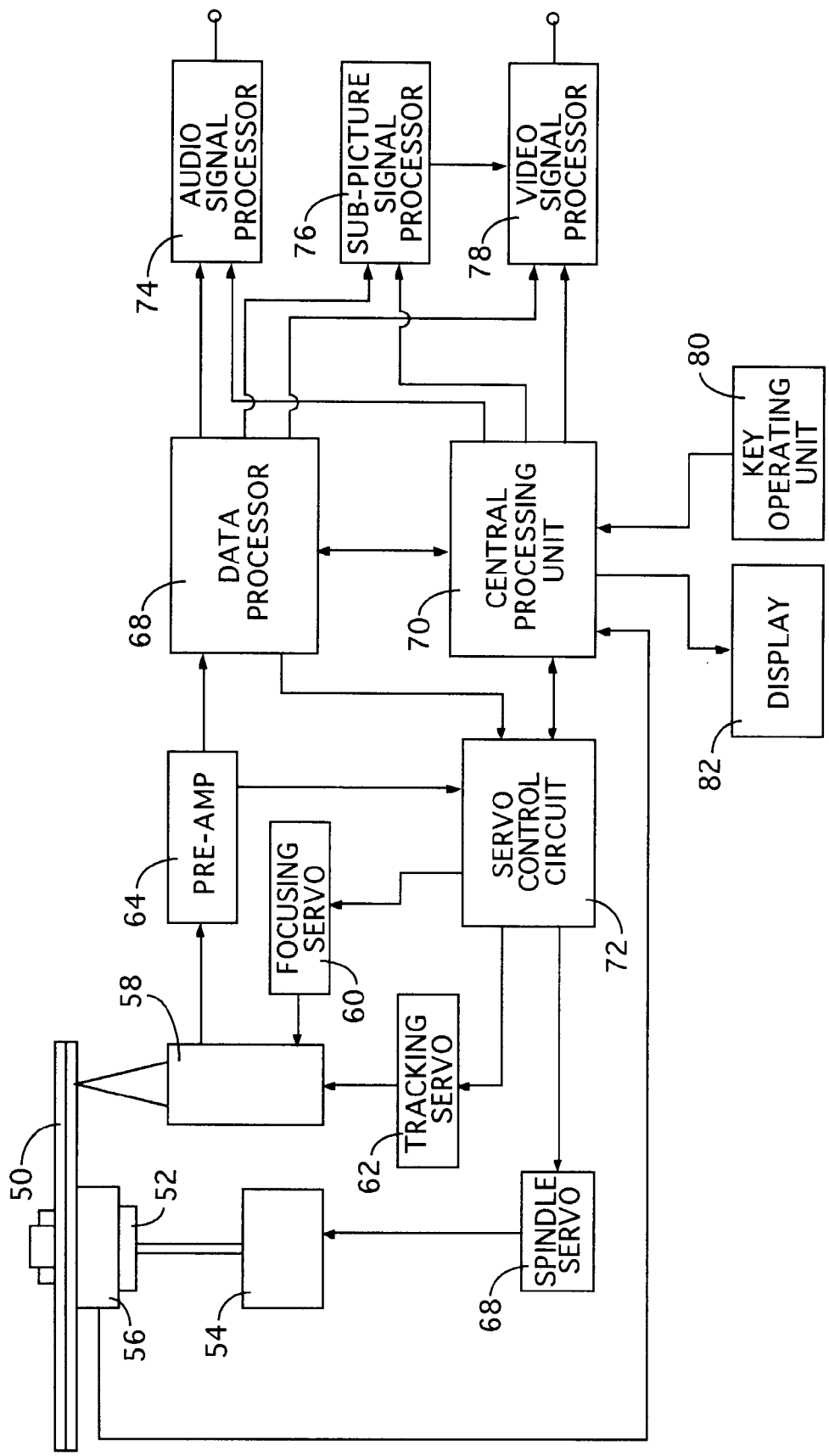
FIG. 2(a) is a block diagram of a second example of an optical reading apparatus to which the present invention can be applied.
Figure 2B:
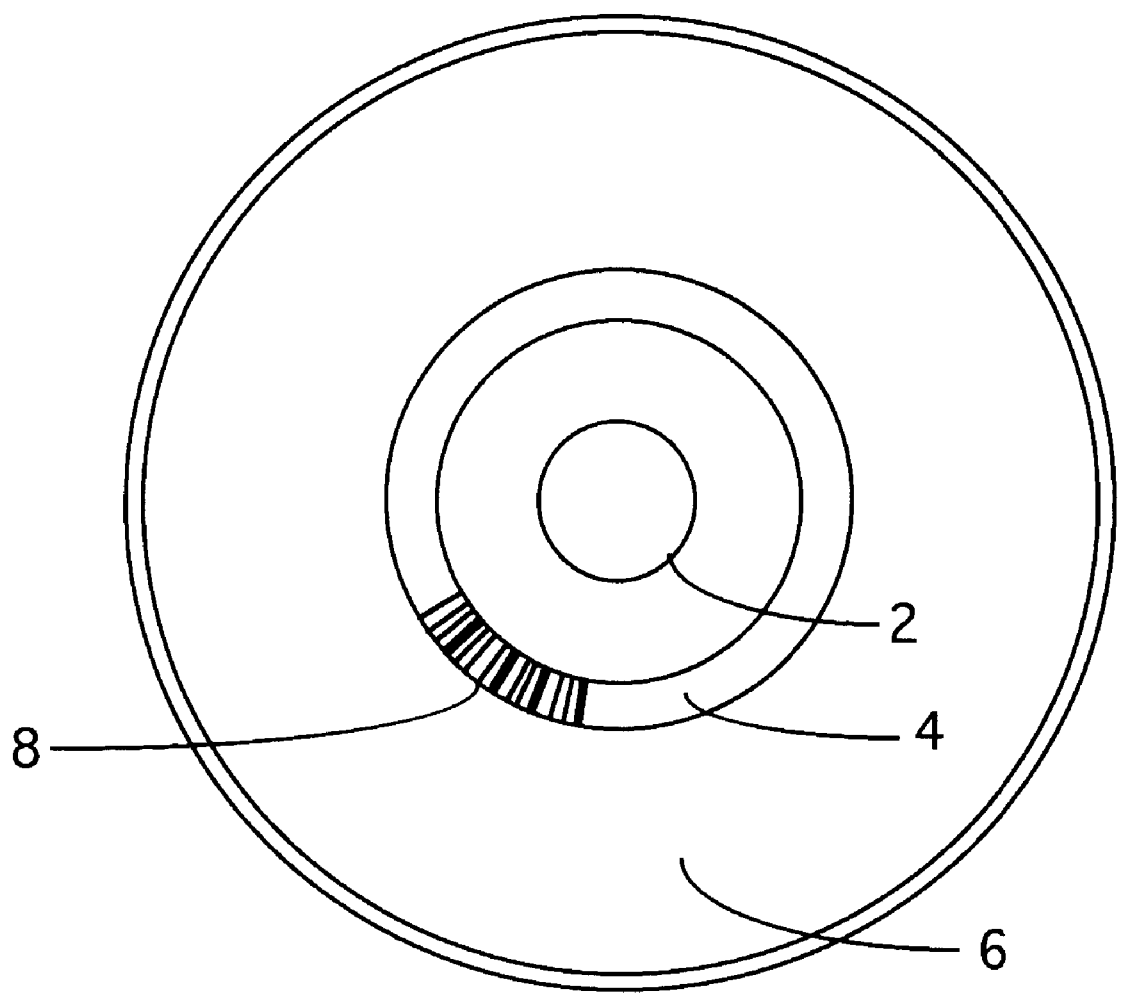
FIG. 2(b) shows a structure of an optical disk which is used in the optical reading apparatus of the present invention described in FIG. 2(a)
Figure 2C:
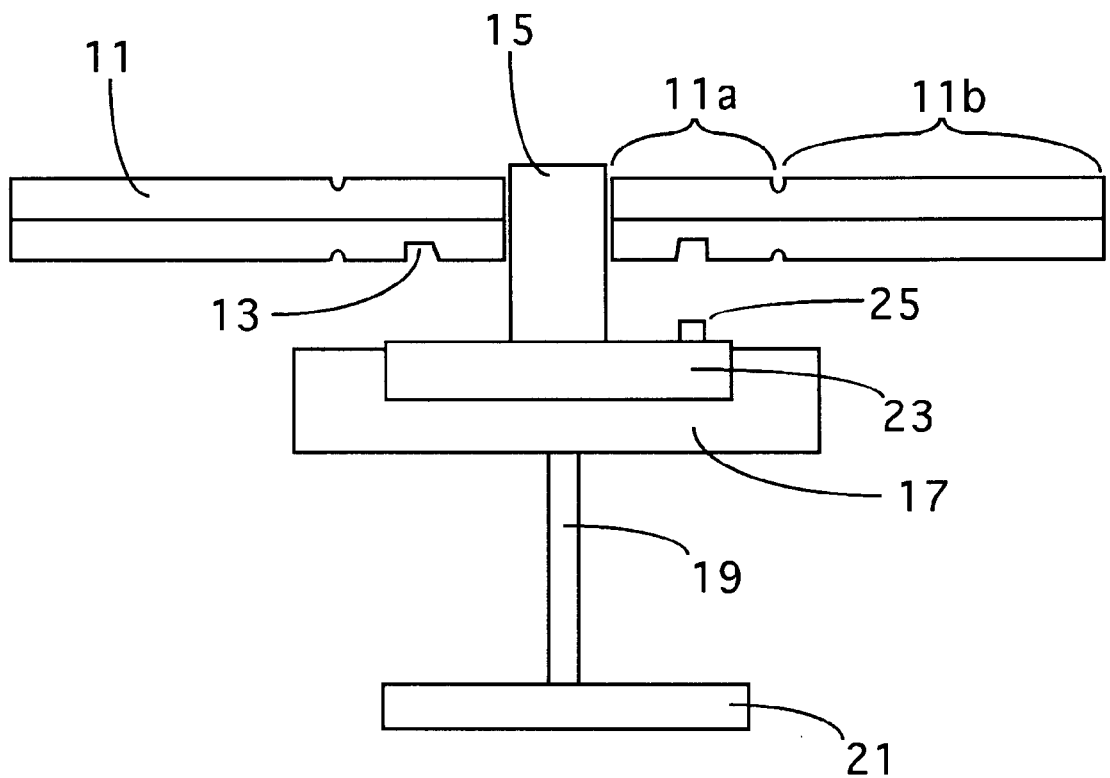
FIG. 2(c) is a structure of an optical disk reading system which is applicable to the optical reading apparatus of the present invention illustrated in FIG. 2(a).

FIG. 2(*a*) is a block diagram of a second example of an optical reading apparatus to which the optical disk reading methods of the present invention can be applied. A sensing device is used differently from the apparatus described in FIG. 1. An optical disk 50 represents one of the optical disk formats among, a compact disk (CD), a Mini-Disk (MD), a digital video disk (DVD) or the other. And optical disk 50 has an identification mark at its label region, as illustrated in FIG. 2(*b*). The identification mark is referential to the standard of the optical disk 50. The optical disk 50 is mounted on and secured by a turntable 52 to be rotated by a spindle motor 54. The identification mark of the optical disk 50 is detected by a photo-sensor 56 to distinguish the standard and type of the optical disk 50. Encoded pits on the optical disk 50 are read by a pickup 58 which includes a laser diode, a focusing lens, a focusing lens actuator, a tracking actuator and a photo-detector. The output signal from the pickup 58 is transmitted to a focusing servo circuit 60, a tracking servo circuit 62 and a pre-amplifier 64. According to a focusing error signal, the focusing servo circuit 60 modulates the focusing lens actuator to move the focusing lens. And according to a tracking error signal, the tracking servo circuit 62 modulates the tracking actuator to move the pickup 58. The spindle servo circuit 66 modulates the spindle motor 54 in order to track the linear velocity of the optical disk 50.

The output signal applied to the pre-amplifier 64 from the pickup 58, is transmitted to a data processor 68. Then the decoded signal is processed by a central processing unit 70 (CPU). The CPU 70 also processes a detected signal from the photo-sensor 56 to identify the standard or type of the optical disk 50. The CPU 70 references the detected signal to stored data about the standard of varied optical disk format, in order to distinguish the standard of the optical disk 50. After the standard of the optical disk 50 is identified, a servo control circuit 72 determines the position of, or selects the focusing len, by modulating the focusing servo circuit 60, and the tracking servo circuit 62 is modulated to move the pickup 58 in order to trace the pit lane which is fabricated in accordance with the pit density standard (which is among the details of how data is stored on the disk).

According to the identified standard of the optical disk 50, the CPU 70 operates the data processor 68 to select an appropriate data encoding circuit in the data processor 68. Then the output signal amplified by the pre-amplifier 64 is decoded by the data processor 68. And the decoded signal is transmitted to an audio processor 74, a sub-picture processor 76 and a video processor 78. The audio processor 74, the sub-picture processor 76 and the video processor 78 are controlled by the CPU 70. The CPU 70 is operated by an operation signal from a key operating unit 80 which transmits all operating signals of an operator. The CPU 70 also controls a display unit 82 to show the data reproduction status to the operator.

FIG. 2(*b*) is a a structure of an optical disk which is applicable to the optical reading apparatus of the present invention described above with respect to FIG. 2(*a*). An optical disk has a center hole 2, label region 4 and encoded data region 6. An identification mark 8 is placed in the label region 4 to be detected by the photo-sensor 56 in FIG. 2(*a*). And the identification mark is referential to the standard of the optical disk. It represents data as to the total number of data encoded layers and the data reproduction in order to set up the movement of the servo mechanisms.

FIG. 2(*c*) is a a structure of an optical disk reading system which is applicable to the optical reading apparatus of the present invention illustrated in FIG. 2(*a*). An optical disk 11 has a label region 11*a* and a data encoded region 11*b*. An optical disk 11 is one of the optical disk formats among a compact disk (CD), a Mini-Disk (MD), a digital video disk (DVD) or any other. And the type or standard of the optical disk 11 is distinguished by an identification groove 13. The optical disk 11 is secured by a center pivot 15, and mounted on a turntable 17 to be rotated by a spindle shaft 19 which is driven by a spindle motor 21. A touch-sensing device 23 is mounted on the turntable 17. And the identification groove 13 is detected by a touch-pin 25 of the touch-sensing device 23. After the standard of the optical disk 11 is identified to set up the movement of servo mechanisms or a data processor, the data reproduction is started.

Although the invention has been particularly shown and described, it is contemplated that various changes and modification may be made without departing from the scope of the invention as set forth in the following claims.

What is claimed is:

1. An optical disk reading method comprising:

loading an optical disk;

directly sensing the disk by a sensing device to detect the total number of data layers of the optical disk;, processing a detection signal from the sensing device by a central processing unit;

referring the processed signal to stored data about a standard of various optical disks to identify the type and standard of the optical disk; and setting modulation of servomechanism means dependent upon the identified optical disk standard;

the servomechanism means including:

a focusing lens servo to modulate position of a focusing lens; and a tracking servo to modulate movement of a pickup.

2. An optical disk reading apparatus for reading optical disks of differing numbers of data layers and corresponding details of data storage, comprising:

means, including an optical sensor, for detecting the total number of data layers of a selected optical disk and producing a detection signal indicative of the detected number of data layers;

a focusing lens;

a pickup;

a servomechanism, including focusing lens servo means for modulating a position of the focusing lens and tracking servo means for modulating movement of the pickup; and a central processing unit having means for processing the detection signal so as to identify the details of data storage on the selected optical disk, by reference to stored data relating the number of data layers to the details of data storage on an optical disk having the detected number of data layers, and for operating the servomechanism based on the identified data storage details.

3. An optical disk reading apparatus for reading optical disks of various numbers of data layers and corresponding formats, the disks having identification marks on a surface thereof, which are indicative of the number of data layers, the apparatus comprising:

a sensor for detecting the identification mark at a surface of a selected optical disk and producing a detection signal indicative of the identification mark;

a focusing lens;

a pickup;

a servomechanism, including focusing lens servo means for modulating a position of the focusing lens and tracking servo means for modulating movement of the pickup; and a central processing unit having means for processing the detection signal so as to identify the number of data layers of the selected optical disk by reference to stored data which relates detection signals to numbers of data layers, and for operating the servomechanism based on the stored data.

4. An optical disk reading apparatus according to claim 3, wherein the sensor is an optical sensor that senses the identification mark by reflecting optical energy from the disk surface and detecting the reflected optical energy, the detection signal corresponding to the reflected optical energy.

5. An optical disk reading apparatus according to claim 3, wherein the identification mark is a groove in a rebel area of the optical disk, further comprising a turntable, the sensor being mounted on the turntable to be associated with the groove, the sensor having means for mechanically detecting the groove.

6. An optical disk reading system, including a DVD optical disk having at least one layers, and an optical disk reading apparatus for reading the disk, the optical reading apparatus comprising:

means, including an optical sensor, for detecting the total number of data layers of the disk and producing a detection signal indicative of the detected number of data layers;

a focusing lens;

a pickup;

a servomechanism, including focusing lens servo means for modulating a position of the focusing lens and tracking servo means for modulating movement of the pickup; and a central processing unit having means for processing the detection signal so as to identify the details of data storage on the disk, by reference to stored data relating the detection signal to the details of data storage, and for operating the servomechanism based on the identified data storage details.

7. A system according to claim 6, wherein the DVD disc has optically readable identification marks on a surface thereof and the sensor is an optical sensor that detects the identification marks on a surface of a DVD disk by reflecting optical energy from the disk surface, detecting the reflected optical energy, and producing the detection signal, wherein the detection signal is indicative of the detected reflected optical energy.

8. A system according to claim 6, wherein the identification mark is a groove in a rebel area of the optical disk, further comprising a turntable, the sensor being mounted on the turntable to be associated with the groove, the sensor having means for mechanically detecting the groove.

9. An optical disk reading apparatus for reading optical disks of differing types, comprising:

an optical sensor for providing a measure of a physical parameter of a selected optical disk and providing a detection signal indicative thereof;

a focusing lens;

a pickup;

a servomechanism, including focusing lens servo means for modulating a position of the focusing lens and tracking servo means for modulating movement of the pickup; and a central processing unit having means for processing the detection signal so as to relate the detection signal to a particular disk type, and for operating the servomechanism based on the particular disk type.

10. An apparatus according to claim 9, wherein the optical sensor provides a measure of disk thickness.

11. An apparatus according to claim 9, wherein the optical sensor provides a measure of disk diameter.

12. An apparatus according to claim 9, wherein the optical sensor provides a measure of the number of disk layers.

13. A method of reading a selected DVD optical disk having at least one data layers, comprising:

detecting the number of data layers of the selected DVD optical disk and producing a detection signal indicative of the detected number of data layers;

processing the detection signal with a central processing unit so as to identify details of data storage on the selected DVD optical disk by reference to stored data relating the detection signal to details of data storage on the selected DVD optical disk; and modulating, based on the identified details, a position of the focusing lens with a focusing lens servo and movement of a pickup with a tracking servo, to read data stored on the selected DVD optical disk.

14. A method according to claim 13, where the detecting the number of data layers of the selected DVD optical disk includes passing light from an optical sensing device through the selected DVD optical disk, detecting the passed light and producing a detection signal indicative of the detected number of data layers based on the detected light.

* * * * *